Nov. 6, 1956
A. A. HIRSCH
2,769,547
ARTICULATED SURFACE WASHING DEVICE WITH OSCILLATORY NOZZLES FOR FILTER BEDS
Filed June 25, 1951
3 Sheets-Sheet 1
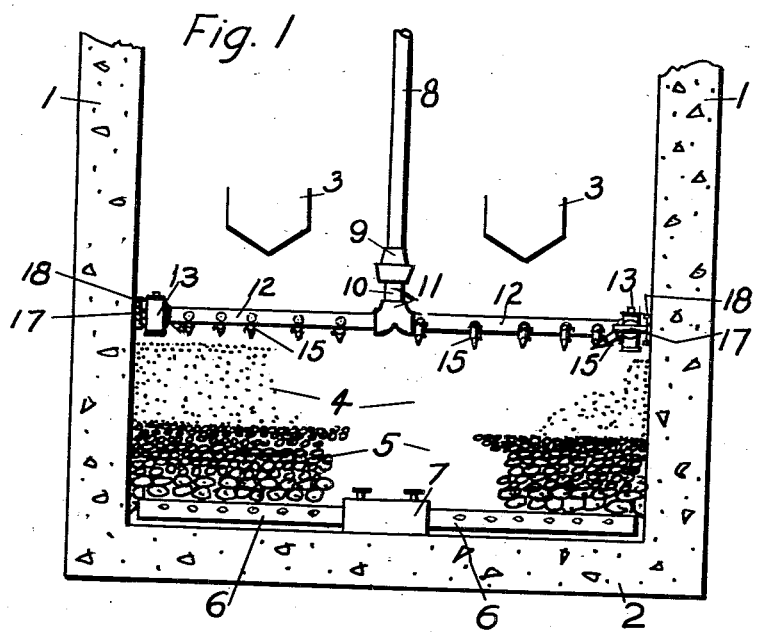
Fig. 1
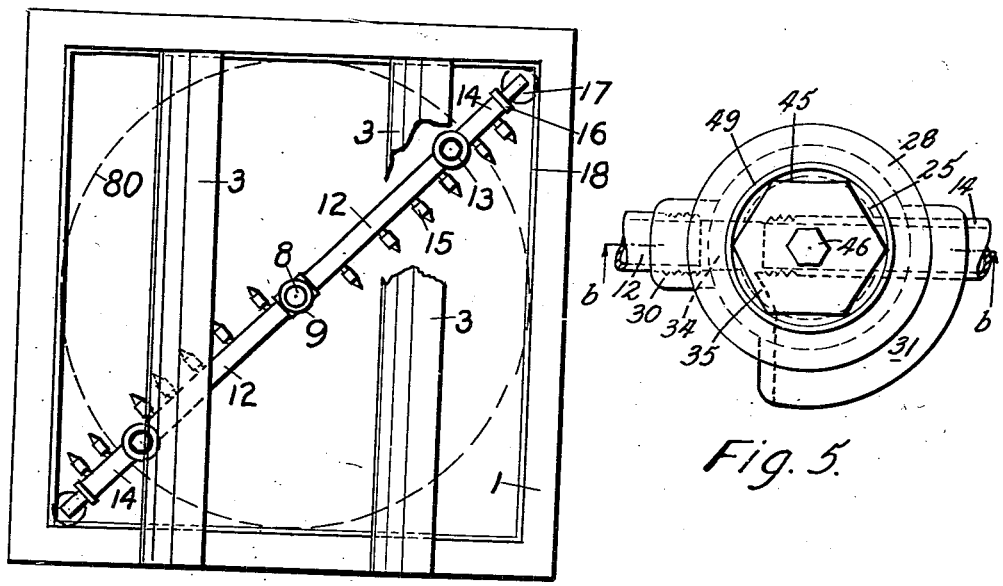
Fig. 2
Fig. 5.
a. adler Hirsch
INVENTOR.

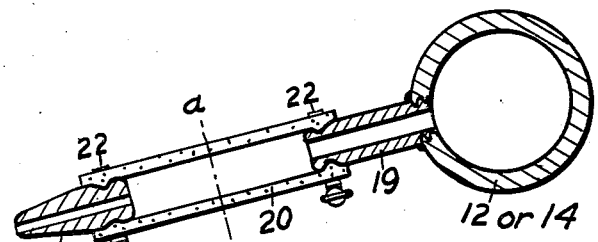
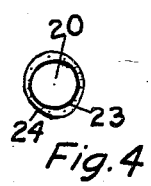
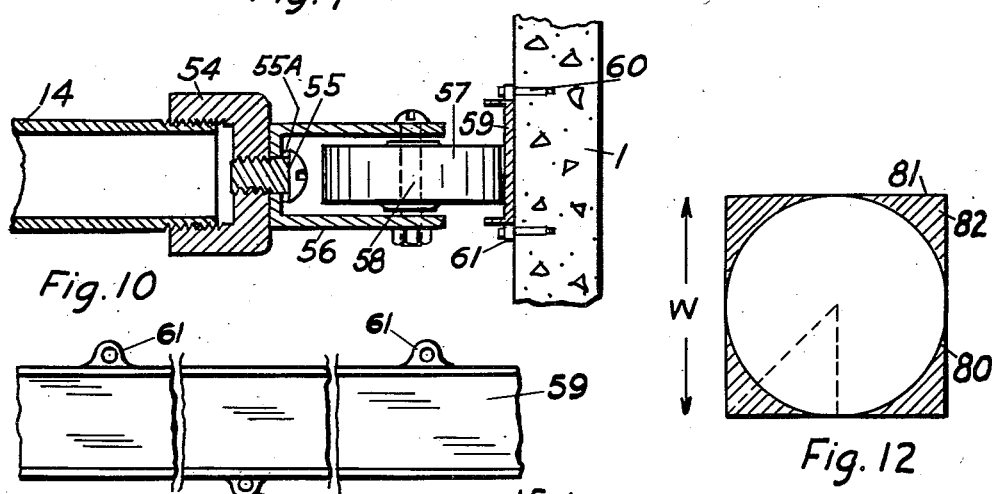
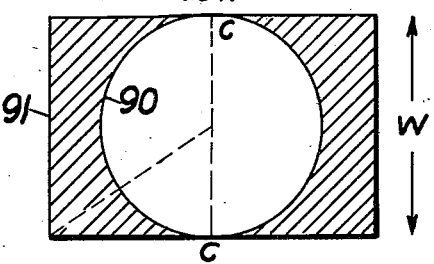
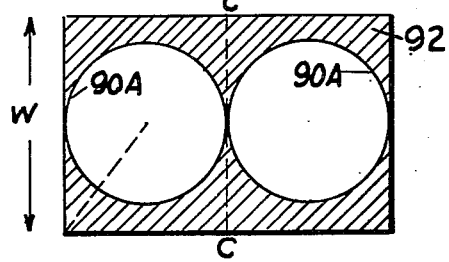

Nov. 6, 1956  A. A. HIRSCH  2,769,547
ARTICULATED SURFACE WASHING DEVICE WITH
OSCILLATORY NOZZLES FOR FILTER BEDS
Filed June 25, 1951  3 Sheets-Sheet 3

A. Adler Hirsch
INVENTOR.

United States Patent Office 2,769,547
Patented Nov. 6, 1956

2,769,547

ARTICULATED SURFACE WASHING DEVICE WITH OSCILLATORY NOZZLES FOR FILTER BEDS

Abraham Adler Hirsch, New Orleans, La.

Application June 25, 1951, Serial No. 233,378

9 Claims. (Cl. 210—129)

My invention has in view several objects relating to various phases in the operation, particularly that of backwashing surficially, of filter beds such as are used in water treatment plants and similar installations in which the liquid to be filtered through a medium consisting of granular material is first flocculated by means of a chemical coagulant and followed by a period of quiescent flow for removal of the bulk of the suspended matter prior to admittance to the filters. In the large majority of water treatment plants filter beds consist of properly sized sand grains, usually supported on a graded gravel layer; other filter media are anthracite screenings, which is competitive and in some respects superior to sand, and crushed stone, used for special purposes. Ordinarily the boxes or structures housing the filter beds are circular or rectangular in outline. Circular beds are confined mainly to small plants, whereas the rectangular shaped filters, on account of ease of construction, are preferred in larger sized plants.

In backwashing filters it has been found advantageous to simultaneously agitate the surface of the expanded sand bed by high pressure water jets, applied by such means as hand-directed hose streams, stationary nozzles mounted on a pipework grid, or by a rotary sweep provided with rigidly attached nozzles. Obviously, any manually controlled operation of this sort is irregular in action; and it is evident that stationary nozzles confine their benefit mainly to fixed spots at the neglect of the other areas. The rotary sweep, as developed heretofore, is deficient in that each jet is constrained over a constant circular path to the neglect of intervening sand bed area except for the sand grains carried into the impingement area by random currents from the upflowing backwash water. The constant circular orbits of fixed jets is disadvantageous for efficient battering of concretions near the surface of the sand, or for destroying dense algae growths, which in resisting currents from the main backwash arrange themselves in nodal patterns. These formations tend to align between the loci of the jets, and only occasionally are shifted into a target zone, and then mainly on the periphery of the jet impact rather than present a close range, centralized target. A fundamental fault of the usual rotary sweep in a rectangular filter box is the poor reach of the jetted water into the corners of the bed where operating difficulties are most likely to develop. In an attempt to overcome this deficiency, outwardly directed terminal nozzles have been placed on the ends of currently manufactured filter sweeps, but the force of the jet is soon dissipated and the corner of the filter still remains inadequately agitated. Furthermore, if such a rotary sweep is allowed to operate, either inadvertently or intentionally, during the filtration phase of the operating cycle, the sand is piled up in the quiescent corners of the filter box, thereby reducing the depth of the bed in the central portions which then filter most of the water at a reduced factor of safety.

It is the object of my invention to correct the above described shortcomings of the rotary filter sweep and to improve its operation by providing the following specific improvements:

1. An articulated joint at the ends of the rotary arms, so that a terminal segment can swing in and out in a rectangular filter box according to the position of the main sweep arm, thereby varying its reach, so that the corners receive thorough surficial agitation, just as do the more centralized areas of the bed.

2. To so valve the swinging terminal segment that the flow thereto of surface wash water is permitted only when the reach of the arm is somewhat extended toward the corners, and to shut off the flow when the articulated arm is passing parallel along the side or end walls of the filter box. Such valving provides a more uniform jetting action over the whole surface of the filter bed and easier rotative motion of the sweep arm assembly than if the water were allow to jet with the terminal segment folded almost at right angles to the main radial segment.

3. To randomize continuously the direction of each individual jet, so that all areas of the filter bed become targets for the high speed whipping streams. This particular improvement may be applied advantageously also to rotary sweeps in circular filter boxes or to otherwise stationary jets mounted on pipework. Wagging of the jets is achieved by mounting them with a flexible hose of special cross section, to be described below, so that they are oscillated about in the plane of impact by the reaction of the high velocity water stream.

All of the above provisions are novel in a device of this character. In rectangular filter beds all three of these features are needed to completely systematize the operation of a surface wash. For circular filters the articulated terminal segment and its control valve are altogether unnecessary, since the usual rotating arm swings over the complete bed during a traverse. However, the feature of plane polarized vacillation of the direction of the jets in a valuable addition to sweeps for circular filter boxes. With stationary jets on grids better and more complete coverage of the filter bed area is attained by symmetrically flexible hose connections.

The principles and construction of my device will be understood from the accompanying drawings in which:

Figure 1 shows in transverse section a filter in which subject articulated washing device is installed. It is shown in position across the short dimension of the filter box, with the articulating segments parallel to the filter wall.

Figure 2 is a plan view of the same filter but with the articulated washing device extending diagonally into the corners to show how agitation therefrom is provided in such areas.

Figure 3 is a longitudinal section through one of the flexibly mounted nozzle assemblies which provide the hydraulic reaction for driving the washing device rotatively while jetting and whipping water at high speed into the expanded sand bed. Figure 4 is a transverse section through the flexible sleeve of the nozzle assembly as along line aa of Figure 3 to show how the desired preferential flexibility is attained by means of an external elliptical outline.

Figure 6:
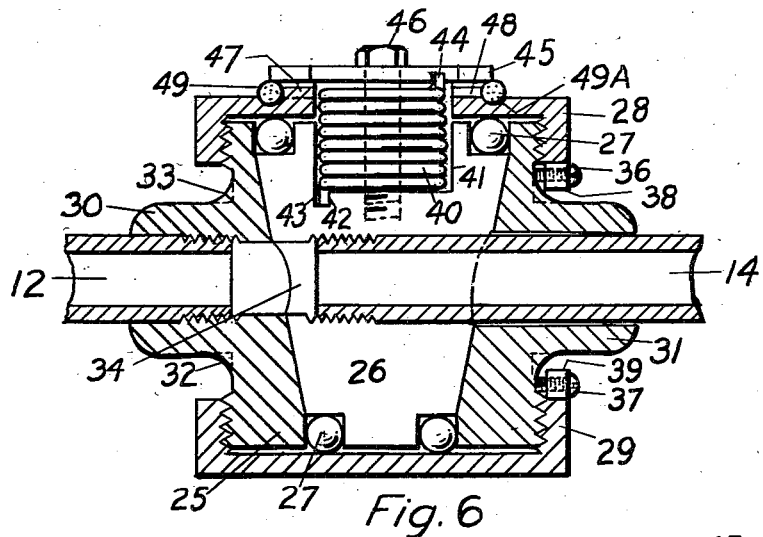
Figure 9:
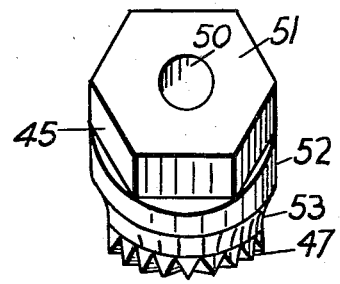
Figure 7:
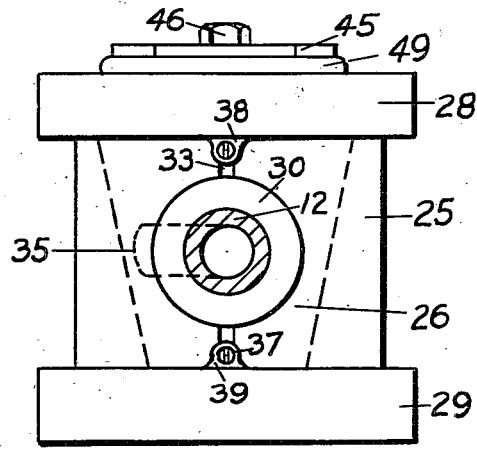
Figure 8:
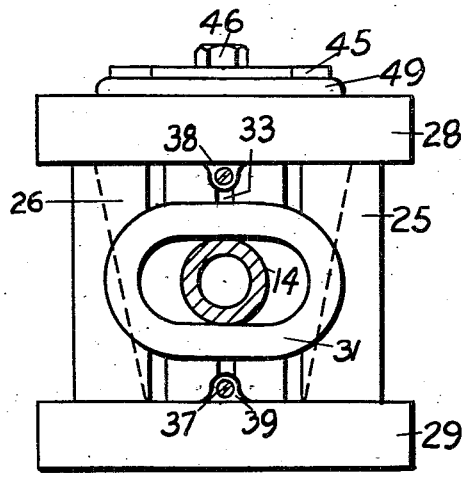

Figures 5, 6, 7, 8 and 9 show details of the articulating or swing valve which permits extension and retraction of the auxiliary washing segment at the same time opening and closing, respectively, its waterway so that jet water passes through its body only when the auxiliary arm is in its extended position toward the corners of a filter. Figure 5 is a plan view of this valve; Figure 6 is a vertical section; Figure 7 is an elevation on the entrant side and Figure 8 is an elevation on the exit side. Figure 9 is a perspective elevational view of the spring adjustment nut.

Figure 10 is a vertical section through the terminal cap on the articulating arm to illustrate how the rollers thereon are guided and the filter wall protected by means of a peripheral track.

Figure 11 is an elevation view of the channel iron which forms this track for the terminal roller.

Figures 12, 13 and 14 diagram the geometrical relationships of a circle inscribed within rectangles of various ratios of length and width, so as to indicate the relative areas ordinarily missed or but feebly jetted by an ordinary rotary filter sweep but which the present device effectively reaches. Figure 12 shows such relations for a square. Figure 13 depicts the case of a rectangle of maximum inequality of side length, namely a ratio of length to width of 1.5. Figure 14 shows the case of Figure 13 resolved into a pair of smaller rectangles to reduce the inequality of length of sides, and so facilitate unimpaired coverage by means of an articulated filter sweep.

Throughout the various views a given numeral represents the same part of the apparatus.

Referring now to the various details illustrated in each of the drawings, Figure 1 shows a conventional rapid sand filter in transverse vertical section. It consists in this case for illustration of an open box having side walls 1 and floor 2 in which is built wash troughs 3 somewhat above the surface of filter bed 4. This bed is composed of granular material such as sand, anthracite screenings, crushed stone or the like, and rests on a support of graded gravel layers 5. Underneath the gravel layers is one of the various types of underdrain systems, for example an assemblage of perforated laterals 6. These pipes connect to a central manifold 7 which in turn connects to the control apparatus in the filter gallery. During the filtration phase of a normal operating cycle, coagulated and settled water is admitted to the filter box by way of troughs 3, and percolates through the sand layer 4, thereby straining out the residual suspended matter. This operation continues until the mat of coagulum deposited in the top portions of the sand impedes the flow of effluent to such an extent that a wide open filter controller can no longer deliver at the desired rate. The filter run is then terminated and the bed restored to its original cleanliness by a process of backwashing.

The operation of backwashing consists in forcing clean water back through the underdrain system, and upward through the gravel layers and sand bed to overflow into the troughs and thence to a drain. During the rise of the washwater the sand bed is expanded and mildly agitated, and floc deposit is lifted from the top of the bed. Collision of individual sand grains tend to scour their respective surfaces more or less free from deposited matter. Experience, however, has amply demonstrated that such a simple backwash is insufficient to completely scour the media or to clean a filter bed properly, due primarily to the fact that the ascending water current is relatively slow, being in the order of only 2 feet per minute, in effect a gentle bath. Therefore, in order to improve the efficiency of a backwash, an auxiliary means must be provided to increase the scouring action between the sand grains. Air jets and hydraulic surface wash systems have been proposed to furnish this action. An objection to air jets is the need for extensive extra piping and the need for operation of an air compressor. Such equipment not only has its own maintenance problems, but also hampers movements of workmen in making repairs to a filter bed. Hydraulic surface wash systems have the advantage of being connected to the pressure water lines. They may be classified into stationary and rotary types. The stationary type, consisting of nozzles mounted on a pipe grid, have the spatial disadvantages of the air wash system, and lack the economy and flexibility of the rotary type. In the rotary type of auxiliary surface wash, jets are carried around the filter in a circular path, on a rotating arm which usually is actuated entirely by the kinetic reaction of the high velocity jetted streams. Rotary arms are supported centrally on either side of a supply pipe; therefore, to give the same sense of rotation, the jets on one side of the central suspension face oppositely in direction from those on the other side. Since the velocity of the jetted water is quite high, in the order of 90 feet per second, depending on the water pressure at the nozzle heads, the sand grains such as in the path of the jetted stream, and at close range, are forcibly impacted and churned against each other with highly improved scouring effect.

Resuming reference to Figure 1, my rotary surface washing device is shown in position slightly above the top of sand layer 4, so as to produce vigorous agitation in the upper zone of the bed when expanded by a backwash, and also to permit motion of the arms prior to the admittance of the main back wash water, or continuously or intermittently at a much slower rate during the production phase of a filter run. Supply pipe 8 furnishes water under high pressure, as 60 pounds per square inch or above, and carries the weight of the assembly. Rotary coupling 9, of which there are several suitable designs on the market, permits the arms to rotate without significant leakage; however, there is no need for this part to be drop proof. It is positioned near the bottom of the water supply line in order to obtain the maximum stability and to minimize wear on its bearings and seals. A short vertical spaced 10 transmits the surface wash water from coupling 9 to T joint 11, here shown streamlined, to which the main rotary arms 12 are joined.

At this point better visualization of the apparatus is gained by use of Figure 2 in which the sweep is shown extended diagonally across a square filter box. The rotary arm assembly consists of main horizontal segments 12 at the ends of which are placed knee-like articulating valves 13 into which are attached the articulating segments 14. In both main and articulating segments along their lengths are located nozzle assemblies 15, at about 15° inclination downward, from which high pressure water jets issue to impinge within and vigorously agitate the expanded sand bed; the reactive force of the water streams from these nozzles is sufficient to propel the main arms and articulating segments rotatively through the expanded sand layer during a backwash. Articulating segments 14 terminate in a cap 16 and roller 17. A channel 18, around the filter walls in the plane of rotation, aids to guide the movement of the articulating segment and reduce wear on the roller and walls.

Jets are spaced radially in a manner to provide equal distribution of surface wash water per unit area swept over, considering each jet as located at the center of an annulus whose inner and outer circumferences are described by points midway between adjacent jets. Furthermore, corresponding jets on each side of the central suspension, as has long been customary in such rotary devices, are staggered radially so that they avoid repetitious orbits and so agitate the whole expanded bed more uniformly.

However, even though successive jet positions are staggered, the distribution of surface wash water from both the main rotary arm and the articulating segment would remain concentrated directly under the loci of the jets and appear as so many furrows cut into the top portion of the expanded sand. Such an effect can best be observed by operating a conventional rotary arm having fixed jets over quiescent sand, in which case the loci of the jet impingements show up as clear cut narrow circular trenches. Complete exposure of all sand grains to such a localized agitation depends largely on the main backwash currents to aid by crosswise motion.

In order to achieve complete uniformity of surface wash distribution and consequent total agitation in the top layers of the sand during backwash, a novel feature is introduced in this device to provide a randomized pattern of targets for the jets over the whole filter area. This is done by mounting the nozzles flexibly on the main and articulating segments.

Referring to Figure 3, a nozzle assembly consists of an adapter 19, screwed or welded to the rotary arm segments 12 or 14, a flexible rubber tubing 20 of circular bore but elliptical peripheral outline so as to flex preferential across the shorter axis which is mounted horizontally, and a nozzle head 21. Clamps 22 retain the joints between the rubber tubing with the adapter and nozzle piece, respectively. Figure 4, a section along line *aa* of Figure 3, shows the special molded rubber connecting hose 20, in which 23 is the circular inner wall, and 24 is the elliptical outside circumference. High pressure water issuing from nozzles 21 cause the rubber connection 20 to whip only in an inclined plane corresponding to the direction of the central axis of the jets, and agitate sinusodially and non-repetitiously an annular area over which the nozzle plays. By having jets slightly overlap in target areas through selection of the length and rigidity of the rubber tubing, the entire sand surface under the rotary arms is forcibly impacted and scoured.

In Figure 5, showing a plan view of the articulating valve 13 in a position with both main and articulating segments 12 and 14, respectively, in line, as when the latter is fully extended, a section is taken along line *bb* to reveal the construction more plainly.

Figure 6, section *bb* of Figure 5, shows constructional details of the articulating valve 13. Within the body casting 25 the plug 26 oscillates to and fro through a quadrant arc. Ball bearings 27, of bronze or other non-corrodible metal, minimize friction between the plug, body casting, top cover plate 28 and bottom cover plate 29. Bosses 30 and 31 at entry and exit sides of the body, respectively, provide mechanical strength. Entrance boss 30 is threaded to receive the end of the main rotary segment 12; and is circular in elevational outline, as seen from the entrant elevation in Figure 7. Exit boss 31 is unthreaded and allows a slight vertical clearance from the emergent articulating arm 14. Since boss 31 must allow for the articulating segment 14 to swing through a 90° arc, it is elongated in outline in the horizontal plane. Reference to the elevation, Figure 8, will show this feature more clearly. A set of ribs, 32 and 33, are placed around both bosses for reinforcement.

Still referring to Figure 6, the waterway 34, through plug 26 is counterbored and then threaded almost to the entrant side to receive the head end of the articulating arm 14; this permits better support than if the plug were threaded on the exit side. The entrant end 35 of the waterway is grooved circumferentially, as is more evident in the elevation Figure 7, to permit continued flow of water until the plug swings through about 60° or so from the extended position when the port closes off.

Two sets of set screws, 36 and 37, in their corresponding lugs 38 and 39, retain the top and bottom plates, 28 and 29, in proper adjustment against the ball bearings 27. A torsional coil spring 40, normally extensive but for certain conditions retractive, nests in a cavity 41 in the top of plug 26; its elasticity is held by terminal prongs 42 which socket at 43 and 44 into the plug and the spring adjustment nut 45. Lock screw 46, which screws into plug 26, holds adjustment nut 45 tightly against the top cover plate 28. Serrations 47 and 48, on the bottom of adjustment nut 45 and the top of cover plate 28 interlock to give a positive grip when lock nut 46 is tightened. A stretched rubber seal ring 49 prevents entry of sand grains into the spring chamber and upper bearings of the swing valve. A groove 49A permits seating of the seal ring on the top plate.

In Figure 9, showing top adjustment nut 45 in greater detail, 50 is a hole for lock nut 46 to pass through, 51 is a hexagonal or equivalently cornered head for gripping with a wrench, 52 a short intervening section, 53 a circumferential groove to provide a contoured seat for the rubber seal ring 49, and 47 a set of radially disposed serrations to grip mating serrations 48 on the upper surface of top plate 28.

Terminal details of the swinging segment are shown in Figure 10 in which the end of articulating arm 14 is threaded to receive screw cap 54. A lock nut or set screw may be used to retain this cap in position. Screw 55 fastens thereto yoke 56, which supports roller 57. A lock washer 55A is placed under the head of screw 55. Roller 57 rotates about axis 58. Channel iron 59 guides roller 57 as well as providing protection against abrasion to both its rolling edge and the concrete or other wall material of the filter box. The diameter of roller 57 should exceed the outside diameter of the terminal cap 54 in order to avoid scraping action whenever segment 14 approximates a right angle with main arm 12. Guide channel 59 is held in place by means of expansion bolts 60 or similar devices passing through lugs 61.

Figure 11 shows the supporting lugs 61 on the guide channel spaced in a staggered pattern along the top and bottom edges. When a filter area is divided for purposes of symmetry or to keep the filter sweep arms from becoming unduly long the guide channels should also span the division lines between adjacent arms so as to provide a continuous guide track for the rollers. Although wall guide 59 is primarily a protective surface, the bottom edge of the channel may also serve as a supporting member whenever the total length of the sweep arms, as in large undivided filters, warrant this arrangement. A supplemental roller may then be added to take the vertical thrust. Such construction will relieve considerable load from the bearings in the central rotary joint 9 as well as from the swing valves 13.

Figure 12 shows simple areal relations between an inscribed circle 80 and a square 81, such as exists when a rotary filter sweep without an auxiliary articulating arm 14, turns in a square filter box. Unagitated or feebly jetted sand portions are represented by area 82 lying between circle 80 and square 81.

Calling $w$ = side of square area of square = $w^2$ area of inscribed circle = $\frac{\pi}{4}w^2$ then intervening area $82 = w^2\left(1 - \frac{\pi}{4}\right) = 0.215\ w^2$ therefore, percent of surficially unwashed portion in $$\text{a square bed} = \frac{0.215\ w^2}{w^2} \times 100 = 21.5\%$$

ratio surficially unwashed portion/circular $$\text{washed area} = \frac{0.215\ w^2}{\frac{\pi}{4}w^2} = 0.27$$

This indicates that for every square foot jetted there is another 0.27 square foot which has wholly or partly escaped surface washing action in the case of a simple rotary filter sweep.

In Figure 13 a circle 90 is inscribed in a rectangle whose length is 1.5 times its width. This condition represents the most extreme disparity for the installation of a simple circular filter sweep since if the length were increased to range between 1.5 to 2.0 times the width, the rectangle could be divided medially to yield two smaller rectangles, now having short sides with length between 0.75 and 1.0 times the width. The latter case then becomes two squares. From this argument it is apparent that discussion of elongated rectangles is needless, as they may be resolved to approach the condition of squares. Thus the rectangle of Figure 13 is so divided by bisector *cc* as to contain the two tangentially inscribed smaller circles 90A in Figure 14. For this case the intervening poorly surface washed area 92 is derived by considering area of rectangle $= 1.5\ w^2$ area of double circles $90A = 2 \times \frac{\pi}{4} \times (0.75\ w)^2$ $\qquad = 0.88\ w^2$ then intervening area $92 = w^2\ (1.5 - 0.88) = 0.62\ w^2$ percent of surficially unwashed portion =

$$\frac{0.62\ w^2}{1.5\ w^2} \times 100 = 41\%$$

ratio surficially unwashed portion/circular washed area $= 41\% / (100\% - 41\%) = 0.69$ In this case for every square foot jetted by a simple circular filter sweep without an articulating arm, there is another 0.69 square foot which has not received proper surface agitation.

The limiting values of the ratio surficially unwashed portion/circular portion, thus varying in practice from 0.27 to 0.69, shows the importance of providing an auxiliary or articulating arm to enable a filter sweep to reach effectively into the corner areas of rectangular filter beds. Inasmuch as the jets of a simple filter sweep tend to throw the sand tangentially toward the walls of the filter box, there will result a thickening in sand concentration at the corners of the bed. Therefore, the relative amounts by volumes of unjetted to jetted sand will be even greater than the limiting figures indicated by simple geometry.

Whereas this device has been described with particular reference to its use in rapid sand or other granular filters of the gravity type, it may also be applied with equal facility and utility to the closed tanks of pressure filters. In general it may be used in any apparatus which contains particulate matter that at intervals needs washing in situ, such as exchanger beds and the like, and in processes in which the fluid may or may not be water.

Whenever used in production of potable water or when the community water supply is the source of surface wash water, a vacuum breaker should be interposed, for sanitary safety, in the supply line 8 at elevation higher than the filter box walls.

Wide departures may be made from the typical description presented herein but without deviating from the principles and spirit of my invention and the claims thereto.

I claim as new:

1. A reactively driven rotary filter sweep having radial conduits on either side of a central suspension, nozzles flexibly attached to said conduit, the flexible connection therefor being elastic and having a minimum section modulus of the area of wall thickness thereof arranged parallel to the axis of said radial conduit, said nozzles being adapted to flex by hydraulic reaction in a plane inclusive of said conduit and inclined about 15 degrees downwardly below the horizontal.

2. A reactively driven rotary filter sweep supported from a central suspension slightly above the media of a filter unit, comprising a main and terminal segment on either side of the said central suspension said terminal segment rotatably mounted by means of an articulating valve so as to oscillate in the same horizontal plane as said main segment, said segments having thereon flexible mounted nozzles constrained by elliptical cross-sectional periphery to vibrate preferentially in a desired plane when motivated by the kinetic reaction of the water issuing therethrough, an articulating valve admitting and shutting flow of surface wash water into said terminal segment as it swings into corners or follows said main segment tangentially, respectively, a torsional spring within said articulating valve, the pressure from which extends said articulating segment to its widest spread position as permitted by proximity of filter walls, and a roller at the distal end of said terminal segment, said roller passing over a guide strip on the walls of said filter unit, and a source of high pressure water supplied to said filter sweep through said central suspension for purposes of reactively rotating said main and terminal segments, oscillating said articulating valve, and jetting from said flexibly mounted nozzles so as to scour the top portions of said filter media.

3. A rotary filter sweep of the construction as in claim 2, but with spring pressure in said articulating valve directed oppositely thereto, so that reach of said articulating segment into the corners of the filter box is achieved by hydraulic reaction of the jets torquewise about said articulating valve, against said spring pressure, said spring aiding in retraction of said articulating arm to assume an angular position with respect to said main arm in order to pass tangentially along a filter wall.

4. The construction of claim 2 in which said spring in said articulating valve is omitted and extension and retraction of said articulating arm derived from hydraulic reaction at the jets thereon and contact with said guide strip on the filter walls, respectively.

5. The combination with a filter box containing granular media, and a rotary filter sweep having radial arms disposed horizontally on either side of a centrally located vertical supply leg, a rotary joint in said leg beneath which said rotary sweep assembly is suspended, nozzles spaced along the length of said radial arms so as to direct water jets into the filter medium adjunctively with vertically ascending backwash and in a manner to cause a turning moment in the same sense of rotation on either side of said radial arm of auxiliary oscillating arms, one each hingedly supported by a valve on the end of each radial arm so as to enable delivery through nozzles thereon of jetted surface wash water at substantially full nozzle velocity to the corners of the filter bed, said valve being supplied with a plug so ported for registry with said radial arm so as to pass water to the terminal oscillating arm only when said oscillating arm is somewhat extended toward the corners of the filter bed and to shut off said flow when the oscillating arm approaches perpendicularity with said radial arm, a rigid connection of said oscillating arm to said plug, a spring in said valve to modify, as desired, hydraulic reaction in extending said oscillating arm to the widest open position with reference to said radial arm according to prevailing proximity of filter walls or corners, anti-friction rollers in said plug and means for their adjustment, means for adjusting torsional resistance of said spring, a seal on said valve to prevent entry of granular filter media into working parts thereof, track strips around and across said filter box in the plane of rotation of said sweep, a terminal roller on the distal end of said oscillating arm which moves in contact with said track strip and nozzles on said radial and oscillating arms, flexible connections by means of which said nozzles are supported from an adapter on said radial arms and said terminal segments, said nozzles being adapted to whip about selectively in the plane of their longitudinal axis and the longitudinal axis of the arm to which they are attached by virtue of a cross-section in the flexible connections between said nozzle and said adapter affixed to said arms having a minimum section modulus along the axis in said plane of whipping, means for attaching said flexible connections to said adapter and nozzle, respectively, said nozzle assemblies being arranged at staggered radii along said arms on either side of said central supply leg.

6. The combination in a filter box containing granular filter media, and a rotary filter sweep having radial arms disposed on either side of a central rotary mounting through which water from a high pressure source is admitted for purposes of motivating said filter sweep and scouring said filter media, of a reactively driven articulating terminal segment on each radial arm thereof, articulations being in the same plane as rotation of said radial arms, means to control flow of surface wash water into said terminal segment according to angulation thereof with said radial arm, and flexibly mounted nozzles positioned along said radial arms and said terminal segments, said flexibly mounted nozzles being adapted to whip preferentially in a desired plane.

7. The structure of claim 6 in which said flexibly mounted nozzles are constrained to whip in a desired plane by having an elliptical outline in cross section on the periphery of the flexible mounting member therefor.

8. The structure of claim 6 in which the means for flow from the radial segment into the terminal segment is an articulating valve which provides collinear flow therethrough at full opening.

9. The structure of claim 6 in which the means for control of flow of surface wash water from the radial arm to the terminal segment is a valve containing a spring member therein for extension or retraction, as desired, of said articulating arm toward or from the walls of said filter box, and a roller on the distal end of said articulating arm.

References Cited in the file of this patent

UNITED STATES PATENTS

| | | |
|---|---|---|
| 1,181,368 | Bridges | May 2, 1916 |
| 1,224,095 | Roberts et al. | Apr. 24, 1917 |
| 1,457,794 | Piper | June 5, 1923 |
| 1,546,714 | Buzbee | July 21, 1925 |
| 1,708,224 | Harris | Apr. 9, 1929 |
| 1,748,898 | Peebles | Feb. 25, 1930 |
| 1,784,798 | Bayard et al. | Dec. 9, 1930 |
| 1,848,176 | Jernberg | Mar. 8, 1932 |
| 1,849,259 | Walker | Mar. 15, 1932 |
| 1,951,462 | Wing | Mar. 20, 1934 |
| 2,309,916 | Palmer | Feb. 2, 1943 |
| 2,309,917 | Palmer | Feb. 2, 1943 |
| 2,538,340 | Tomek et al. | Jan. 16, 1951 |

FOREIGN PATENTS

| | | |
|---|---|---|
| 132,977 | Australia | June 1, 1949 |